United States Patent
Burke et al.

(10) Patent No.: US 6,748,478 B1
(45) Date of Patent: Jun. 8, 2004

(54) SYSTEM FUNCTION CONFIGURABLE COMPUTING PLATFORM

(75) Inventors: Brian M. Burke, Hopedale, MA (US);
Gary A. Solomon, Acton, MA (US);
Nicolas Finamore, Acton, MA (US);
Matthew D. Theall, Newton, MA (US);
Matthew C. Campbell, Marlboro, MA (US)

(73) Assignee: Intel Corporation, Santa Clara, CA (US)

(*) Notice: Subject to any disclaimer, the term of this patent is extended or adjusted under 35 U.S.C. 154(b) by 461 days.

(21) Appl. No.: 09/753,161

(22) Filed: Dec. 27, 2000

(51) Int. Cl.$^7$ ................................................ G06F 1/00
(52) U.S. Cl. .................. 710/312; 710/311; 710/313; 710/315; 710/8; 710/10; 710/16
(58) Field of Search ................. 710/305–306, 710/311–312, 313–315, 300–304, 8–16

(56) References Cited

U.S. PATENT DOCUMENTS

| | | | | |
|---|---|---|---|---|
| 5,734,850 A | * | 3/1998 | Kenny et al. | 710/306 |
| 5,832,238 A | * | 11/1998 | Helms | 710/304 |
| 6,295,566 B1 | * | 9/2001 | Stufflebeam | 710/103 |
| 6,425,033 B1 | * | 7/2002 | Conway et al. | 710/306 |
| 6,574,695 B1 | * | 6/2003 | Mott et al. | 710/302 |
| 6,606,679 B2 | * | 8/2003 | Solomon et al. | 710/314 |
| 6,665,762 B2 | * | 12/2003 | Hofer | 710/300 |

OTHER PUBLICATIONS

PCI Local Bus, PCI–to–PCI Bridge Architecture Specification, 149 pages.
21555 Non Transparent PCI–to–PCI Bridge, Advanced Information User's Manual, 204 pages.
CompactPCI® Specification, PICMG 2.0 R3.0, Oct. 1, 1999 (including ECN 2.0–3.0–002: Self–Describing Slot Geography Adopted Jan. 23, 2002)—PCI Industrial Computers.

* cited by examiner

Primary Examiner—Paul R. Myers
Assistant Examiner—Raymond N Phan
(74) Attorney, Agent, or Firm—Paul G. Nagy

(57) ABSTRACT

Disclosed are a system and method of configuring processing resources for communication with one or more devices coupled to a data bus through a bridge. Resources at a processing system may be configured to communicate with the bridge as a transparent bridge or a non-transparent bridge depending on how the processing system may be implemented in a processing platform.

38 Claims, 7 Drawing Sheets

SYSTEM FUNCTION CONFIGURABLE COMPUTING PLATFORM

BACKGROUND

1. Field

The subject matter disclosed herein relates to data busses. In particular, the subject matter disclosed herein relates to data busses for transmitting data among devices coupled to data busses.

2. Related Information

Processing platforms typically employ data busses for transmitting data between a host processor and peripheral devices coupled to the busses. Such a data bus typically has a limited number of connection points for coupling to devices, and can typically only directly couple to a finite number of peripheral devices. To expand the number of peripheral devices to communicate with a host processor, a bridge may be coupled to a connection point on a bus to form an additional bus.

Host processor based software typically executes an enumeration procedure to identify devices coupled to the data busses, and to allocate processing resources for facilitating communication with the coupled devices. Resources may be allocated to devices coupled to a data bus behind a bridge either "transparently" or "non-transparently." In a transparent resource allocation procedure, the host processor typically identifies the devices behind the bridge and specifically allocates processing resources to the devices. In a non-transparent resource allocation, a host processor may allocate resources to the bridge without knowledge of the specific peripheral devices coupled to the host processor through the bridge.

A system board may be constructed to comprise a CPU, system memory and host bridge to connect to a data bus. The data bus function may be expanded by the use of a transparent bridge to couple the data bus to an external data bus. The system board may then be integrated with a processing platform by coupling the transparent bridge to the data bus. The implementation of transparent or non-transparent resource allocation has typically involved the use of different devices for implementing transparent and non-transparent bridges. Therefore, manufacturing some system boards employing transparent bridge devices and other system boards employing non-transparent bridge devices, as well as differentiating among underlying system board designs, depends upon whether transparent or non-transparent resource allocation is to be employed.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
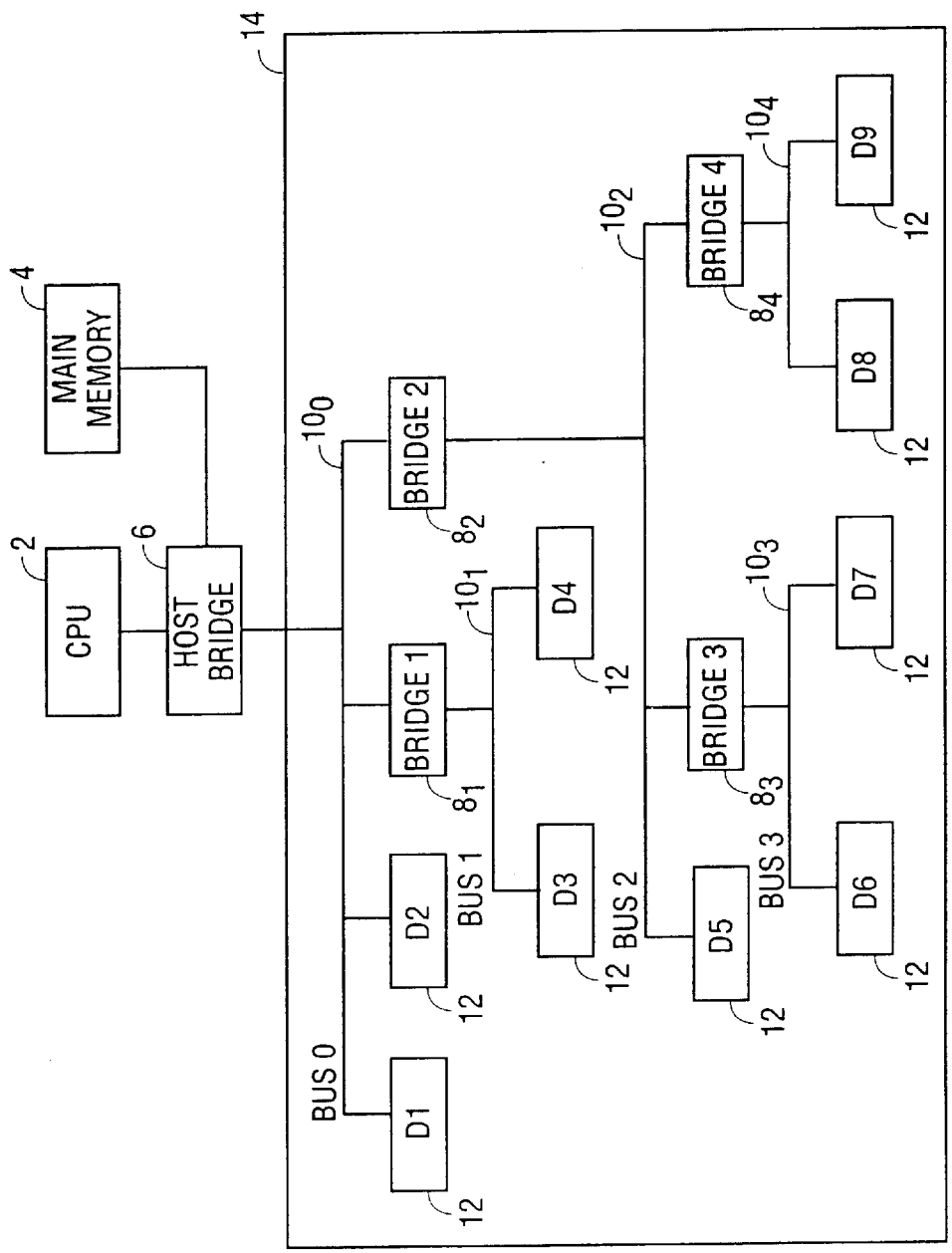
FIG. 1 is a schematic diagram illustrating aspects of a processing system according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "processing system" as referred to herein relates to a combination of hardware and software resources for accomplishing computational tasks. For example, a processing system may comprise a processor for executing instructions and either dedicated (e.g., Harvard architecture) or common (e.g., Van Neuman architecture) memory subsystems for storing data. However, embodiments of the present invention are not limited in this respect and other processing systems may be used.

A "host processing system" as referred to herein relates to a processing system which may comprise a central processing unit (CPU) and system memory for hosting application processes. A host processing system may be adapted to communicate with a "peripheral device." For example, a peripheral device may provide inputs to or receive outputs from an application process hosted on the host processing system. However, this is merely an example of a host processing system and embodiments of the present invention are not limited in this respect.

A peripheral device may comprise a "local processing system" for performing computational tasks associated with the peripheral device. A local processing system may comprise a local processor and memory. However, this is merely an example of a local processing system and embodiments of the present invention are not limited in this respect.

A "bus" as referred to herein relates to circuitry for transmitting data between or among devices. According to an embodiment, a bus may transmit data between processing resources and peripheral devices of a computer system. However, embodiments of the present invention are not limited in this respect and other applications of a bus may be used. A "bridge" as referred to herein relates to a device coupled between busses to transmit data between devices coupled to one bus and another bus. According to an embodiment, a bridge may be coupled between two busses for transmitting data between peripheral devices and processing resources. However, embodiments of the present invention are not limited in this respect and other applications of a bridge may be used. A "bus configuration" as referred to herein relates to two or more communication busses coupled together by one or more bridges. Such a bus, bridge or bus configuration as described herein may be formed according to a peripheral components interconnection (PCI) as described in the PCI-to-PCI Bridge Architecture Specification, Rev. 1.1, Dec. 18, 1998 (hereinafter "PCI Bridge Specification"). However, embodiments of the present invention are not limited in this respect and a bus, bridge or bus configuration according to other embodiments may be employed using other techniques.

A "host bus" as referred to herein relates to a bus for transmitting data between or among processing resources of a processing system. For example, a host bus may transmit data between a processor and a memory. However, this is merely an example of a host bus and embodiments of the present invention are not limited in this respect. A "host bridge" as referred to herein relates to a bridge for coupling a host bus to a second bus to facilitate communication between a processing system and devices coupled to the second bus. However, this is merely an example of a host bridge and embodiments of the present invention are not limited in this respect.

Embodiments of the present invention relate to a system and method of configuring processing resources for communication with devices coupled to a processing system through a bridge based upon how the bridge is implemented in a processing platform. Peripheral devices coupled to a processing system via a bridge or a plurality of bridges may be configured to enable communication among each related device driver, its local resources of its corresponding peripheral device and processing resources. Resources at a processing system may be configured to communicate with devices coupled to the processing system through the bridge. The bridge may be adapted to behave as either a transparent bridge or a non-transparent bridge depending on how the bridge is implemented in the processing platform.

FIG. 1 shows a schematic diagram illustrating aspects of a processing system according to an embodiment of the present invention. A CPU 2 is coupled to a main memory 4 for executing processes. The CPU 2 is coupled through a host bridge 6 to a bus configuration 14. The bus configuration 14 comprises a plurality of data busses 10 coupled by bridges 8. One or more peripheral devices 12 may be coupled to a bus 10 for communication with other peripheral devices 12 and/or processes executing on the CPU 2. According to an embodiment, the CPU 2 and main memory 4 may host device drivers to enable communication between application processes and the peripheral devices 12 according to a communication protocol. However, embodiments of the present invention are limited in this respect and the peripheral devices 12 may communicate with application processes using other techniques.

In the illustrated embodiment, each bridge 8 comprises a "primary interface" coupled to a "primary bus" closest to the CPU 2, and a "secondary interface" coupled to a "secondary bus" furthest from the CPU 2. Thus, the bridge 8 may transmit data between the host bridge 6 and devices coupled to the secondary bus of the bridge 8. However, embodiments of the present invention are not limited in this respect and a bridge 8 may transmit data between devices coupled to the secondary bus and devices other than the host bridge 6. A first bridge 8 may also transmit data to and from devices coupled to busses 10 through a second bridge coupled to the secondary bus of the first bridge. For example, the embodiment shown in FIG. 1 shows bridge 82 coupled to bus 102 as a secondary bus, and coupled to busses 103 and 104 through bridges 83 and 84, respectively.

According to an embodiment, the busses 10 in the bus configuration 14 may be hierarchically numbered beginning with a "bus 0" (bus $10_0$) coupled directly to the host bridge 6 to a "bus 4" (bus $10_4$) coupled to the host bridge 6 through bus 0 and "bus 2" (bus $0_2$). Each bridge 8 may have a corresponding "subordinate bus" referring to the lowest ranking bus in the hierarchy or bus having the highest chronological bus number. In the illustrated embodiment, for example, the bus 4 is a subordinate bus.

In the illustrated embodiment, the CPU 2 executes an enumeration procedure to allocate processing resources to the peripheral devices 12. Such processing resources may comprise, for example, memory and interrupts to facilitate communication with the processes hosted on the CPU 2. During or following the enumeration procedure, the CPU 2 may launch device drivers. A launched device driver may then perform additional procedures to initialize system memory resident constructs, or to initialize a corresponding peripheral device 12. It should be understood, however, that embodiments of the present invention are not limited in this respect and other techniques may be employed for allocating resources to facilitate communication between the peripheral devices 12 and processes executing on the CPU 2.

A "transparent bridge" as referred to herein relates to a bridge which provides information to a processing system identifying devices coupled to a secondary bus of the transparent bridge during an enumeration procedure. For example, such a transparent bridge may provide the processing system with direct access to information at devices coupled to a secondary bus through the bridge. However, this is merely an example of a transparent bridge and embodiments of the present invention are not limited in this respect. A "non-transparent bridge" as referred to herein relates to a bridge which conceals from a processing system the identity of devices on a secondary bus of the non-transparent bridge during an enumeration procedure. During an enumeration procedure in the presently illustrated embodiment, a processing system may allocate resources for specific devices on a secondary bus of a transparent bridge. For devices coupled to a secondary bus of a non-transparent bridge, on the other hand, the processing system may allocate resources generally for the devices without allocating specific resources to specific devices. However, embodiments of the present invention are not limited in this respect and other techniques may be used to allocate resources to devices during an enumeration procedure.

Figure 2:
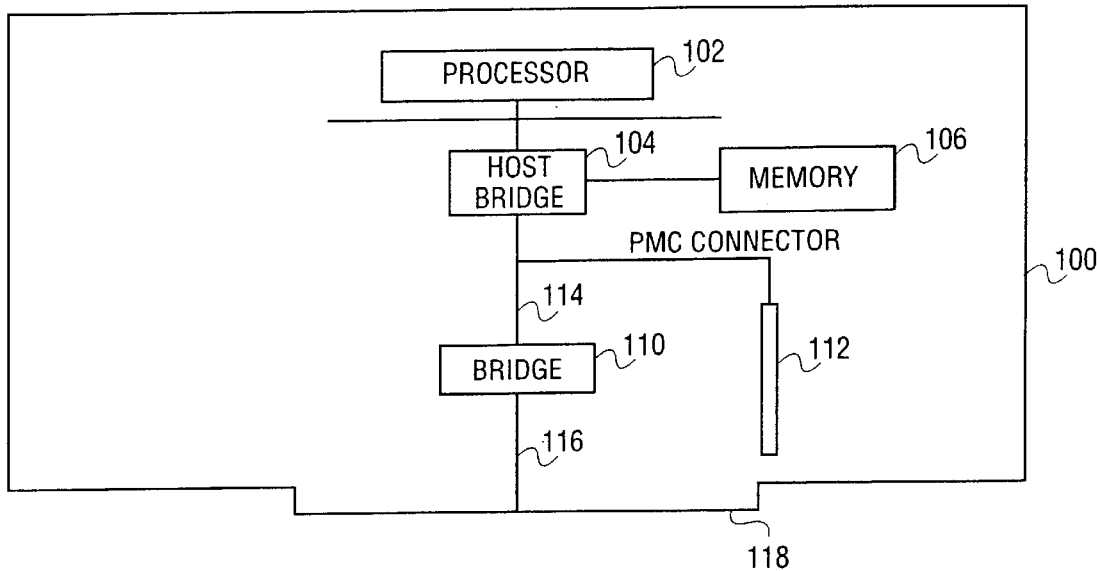
FIGS. 2 and 3 are schematic diagrams illustrating implementations of a bridge according to an embodiment of the present invention.
Figure 3:
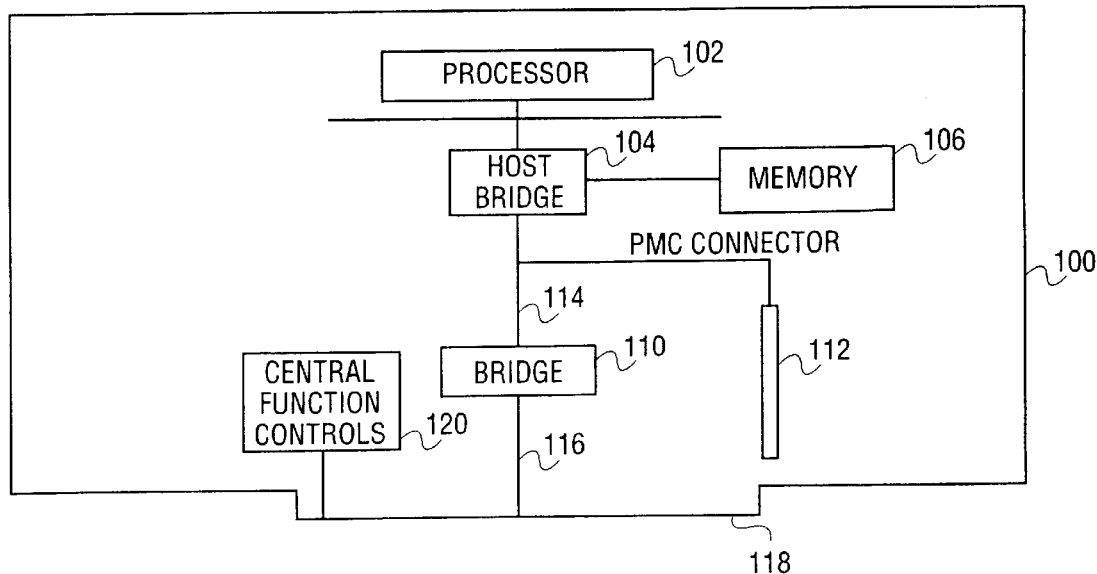

FIGS. 2 and 3 show schematic diagrams of a processing board 100 which may be integrated as part of a processing platform at an interface 118 according to an embodiment of the present invention. In some embodiments, the processing board 100 may comprise a processing backplane to be integrated as part of an embedded or non-embedded processing platform. However, embodiments of the present invention are not limited in this respect. Also, embodiments of the processing board 100 may be formed in accordance with the CompactPCI™ Specification 2.0, Sep. 2, 1997, PCI Industrial Computer Manufacturers Group (PICMG) (hereinafter the "CompactPCI Specification"). However, embodiments of the present invention are not limited in this respect.

The processing board 100 comprises a bridge 110 coupled to a processor 102 and system memory 106 through a host bridge 104 and a bus 114. In one embodiment, the bridge 110 may be a PCI-to-PCI bridge such as, for example, a 21555 PCI-to-PCI bridge sold by Intel Corporation or other similar bridge products capable of operating as a non-transparent bridge. However, embodiments of the present invention are not limited in this respect and other commercially available bridge products may be used.

In the illustrated embodiments, the bridge 110 is oriented in a native non-transparent state and defines bus 116 as a primary bus (being furthest from a host processing system) and bus 114 as a secondary bus (being nearest to the host processing system) to orient the processing board 100 as a peripheral device in a processing platform. Accordingly, the bus 116 may couple the bridge 110 to additional bridges or other peripheral devices through the interface 118. However, as illustrated with reference to FIG. 3, the processing board 100 may be adapted to define bus 114 as a "logical" primary bus and 116 as a "logical" secondary bus when the processing board 100 is to provide a host processing system.

FIG. 2 illustrates an embodiment in which the processing board 100 is integrated with a processing platform comprising a host processing system to be coupled to the processing board 100 through the interface 118. For example, the processing board 100 in the embodiment of FIG. 2 may be operating as an "add-in card" to provide one or more peripheral functions to the processing platform such as, for example, an input/output controller. However, this is merely an example of how the processing board may employed in a processing platform with a host processing system and embodiments of the present invention are not limited in this respect.

In the embodiment shown in FIG. 2, a local processing system comprising the processor 102 and memory 106 may perform an enumeration procedure independent of the host processing system to allocate processing resources to devices coupled to the bus 114 acting as a primary bus. In the illustrated embodiment, the processor 102 executes an enumeration procedure and treats the bridge 110 as a non-transparent bridge and may allocate processing resources to devices coupled to the host bridge 104. For example, the processor 102 may enumerate agents coupled to the bus 114 including the bridge 110 and devices deployed on a PMC module 112 and without enumerating devices beyond the bridge 110. This may be preformed by setting registers on the secondary interface of bridge 110 using an SROM, local processor or device drivers coupled to the primary interface. For example, the registers may be set so as to request specific resources during an enumeration process on the primary bus.

The host processing system may then perform a subsequent PCI bus scan to discover the bridge 110. The PCI enumeration process executed by the host processing system may allocate resources to the primary interface of the bridge 110. Resources allocated to the devices coupled to the non-transparent bridge may be redirected to the appropriate resources allocated to the secondary bus of the non-transparent bridge by the non-transparent bridge base registers. This enables the host processing system to allocate the resources the without any specific knowledge of these local devices coupled to the bus 114. This may be implemented by selecting a bridge 110 that operates as a non-transparent PCI-to-PCI bridge in a native state, and executing an enumeration procedure in accordance with the PCI-to-PCI Bridge Specification. However, embodiments of the present invention are not limited in this respect and other types of bridges and enumeration procedures may be used.

FIG. 3 illustrates an embodiment in which the processing board 100 is integrated with a processing platform to perform as a system board and central function for the processing platform. In the illustrated embodiment, the processor 102 is notified that the processing board 100 is to serve as the system board and platform central function when the processing board 100 is mounted in a system board slot at the interface 118. In an embodiment in which the processing board 100 is formed according to the CompactPCI Specification, for example, a system board slot provides central function controls 120 to the bus 116 at the interface 118. The central control functions 120 may include, for example, a PCI clock, reset logic (including bus parking), and bus arbiter and interrupt control logic. In a processing platform provided in accordance with the CompactPCI Specification, for example, a "SYSEN" signal may identify the slot as a system board slot. However, embodiments of the present invention are not limited in this respect. In other embodiments, for example, jumpers may be coupled to the processing board 100 to provide a signal identifying a function of the processing board 100 in lieu of signals provided at an interface for the system control functions on the interface 118. Again, these are merely examples of how a processor or processing board may receive a signal indicating the processor's role in a processing platform and embodiments of the present invention are not limited in this respect.

In the embodiment illustrated in FIG. 3, a host processing system comprises the processor 102 (acting as a CPU for a processing platform in response to the board being mounted in a system board slot) and the memory 106 and may execute an enumeration procedure to allocate processing resources to devices coupled to the bus 116. As pointed out above, the bridge 110 may be a bridge which defines bus 116 as a primary bus and bus 114 as a secondary bus in a native non-transparent state of the bridge. However, the processing board 100 may be adapted to define bus 114 as a "logical" primary bus and 116 as a "logical" secondary bus when the processing board 100 is to provide a host processing system. Accordingly, the processor 102 may execute an enumeration procedure treating the bridge 110 as a transparent bridge and may allocate processing resources to specific devices coupled to the bus 116 (acting as the logical secondary bus). However, embodiments of the present invention are not limited in this respect and other types of bridges and enumeration procedures may be used.

According to an embodiment, a processing system may execute an enumeration procedure for allocating resources to peripheral devices coupled to a bus configuration. In a PCI bus configuration, for example, a processing system may initiate bus commands to initiate a "type 0" configuration transaction with devices coupled to a bus as described in the PCI-to-PCI Bridge Specification at Section 3.1.1, or bus commands to initiate a "type 1" configuration transaction with devices coupled to a bus beyond a transparent bridge as described in the PCI-to-PCI Bridge Specification at Section 3.2.1. However, these are merely examples of how devices on a bus configuration may be enumerated and embodiments of the present invention are not limited in this respect.

In the illustrated embodiment, a processing system addresses bus commands to targeted devices in a bus configuration according to a bus number and device number on the bus. In response to such a bus command, a targeted device may return configuration header information with descriptor information characterizing the device. In a PCI bus configuration, for example, a targeted device may return configuration header data as illustrated in the PCI-to-PCI Bridge Specification at Section 3.2. However, embodiments of the present invention are not limited in this respect and information characterizing the targeted device may be provided using other techniques.

If such a configuration header indicates that the targeted device is a transparent bridge device (e.g., from a "header type" register), the enumeration procedure may initialize secondary and subordinate bus number field in the bridge's registers, and may then initiate type 1 configuration transactions with the bridge to locate devices coupled behind the bridge and allocate processing resources to the located downstream devices. Again, embodiments of the present invention are not limited in this respect and information characterizing the targeted device behind the transparent bridge may be provided in an enumeration procedure using other techniques.

According to an embodiment in a PCI bus configuration, a transparent bridge may receive a type 1 configuration request addressed to a device on a bus coupled behind the transparent bridge. If the type 1 configuration request is directed to a device on the secondary bus of the transparent bridge, the transparent bridge may convert the type 1 configuration to a type 0 configuration request to be transmitted on the secondary bus as described in the PCI-to-PCI Bridge Specification at Section 3.1.2.1.1. However, embodiments of the present invention are not limited in this respect. If the type 1 configuration request is directed to a device residing on a bus behind a second transparent bridge on the secondary bus, the transparent bridge may forward the type 1 configuration request to the second transparent bridge as described in the PCI Specification at Section 3.1.2.1.2. However, embodiments of the present invention are not limited in this respect.

Figure 4:
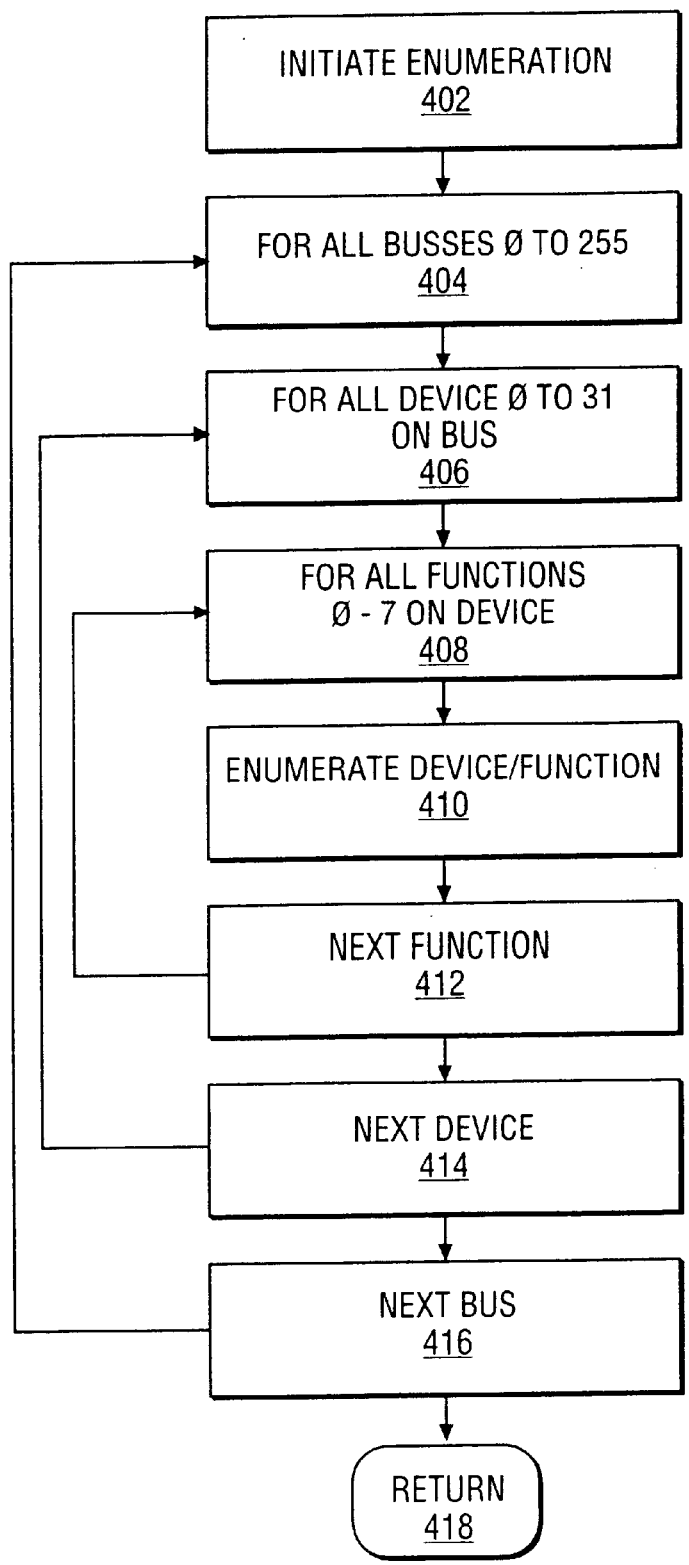
FIG. 4 is a schematic diagram illustrating aspects of a system illustrating system initialization according to an embodiment of the present invention.

FIG. 4 shows a flow diagram illustrating a process 400 for enumerating devices coupled to a bus configuration. In the illustrated embodiment, the process may be executed under the control of a host processor. For example, the process 400 may be executed as part of a procedure to boot a computer system during which resources are allocated to enable communication with peripheral devices. However, embodiments of the present invention are not limited in this respect. Also, the process 400 may be implemented as software instructions which are stored a non-volatile memory device such as a memory in a BIOS or as part of an operating system. Again, embodiments of the present invention are not limited in this respect.

As illustrated with reference to FIG. 1, a bus configuration may comprise one or more numbered busses (e.g., numbered from zero to a finite number as shown in the presently illustrated embodiment). Also, one or more numbered devices (e.g., numbered from zero to a finite number as shown in the presently illustrated embodiment) may be coupled to any of the busses for communication with a host processor. In some embodiments, a device may be comprised of one or more functions for which the enumeration procedure may allocate processing resources. The process 400 comprises logic to enumerate each function of each device coupled to a bus configuration by identifying the device and function and allocating resources to the identified device and function. This enumeration process may also comprise maintaining a data structure identifying enumerated devices and functions, and indicating locations or addresses of the enumerated devices on the bus configuration. However, embodiments of the present invention are not limited in these respects and other embodiments may perform such an enumeration process using other techniques. The process of enumerating the devices and functions in the bus configuration may be carried out executing logic identified by block 410 within loops defined by blocks 404 and 416 (for devices coupled to each of the busses), blocks 406 and 414 (for each device coupled to a bus) and blocks 408 and 412 (for each function of a device). However, embodiments of the present invention are not limited in this respect and an enumeration process may using other techniques for enumerating devices coupled to a bus configuration.

According to an embodiment, a bridge may be in a bus configuration at a predetermined address which is known at the outset of the enumeration procedure. Additionally, the enumeration procedure may have access to other information such as a "system function signal" indicating a function of the bus configuration in a processing platform. According to embodiments illustrated with reference to FIGS. 2 and 3, such a system function signal may be indicative of a use of the processing board 100 to perform a peripheral function (as illustrated with reference to FIG. 2) or may be indicative of a use of the processing board 100 to perform a system board central function (as illustrated with reference to FIG. 3). However, embodiments of the present invention are not limited in this respect and such a system function may be indicative of other functions of a bus configuration in a processing platform. Additionally, the bridge in the bus configuration may be the last device to be enumerated on its primary bus leaving the devices coupled behind the bridge to be the last devices to be enumerated at the host processing system. According to an embodiment, an enumeration procedure may selectively enumerate such a bridge at the predetermined location to appear as either a transparent bridge or a non-transparent bridge based upon the system function signal.

Figure 5:
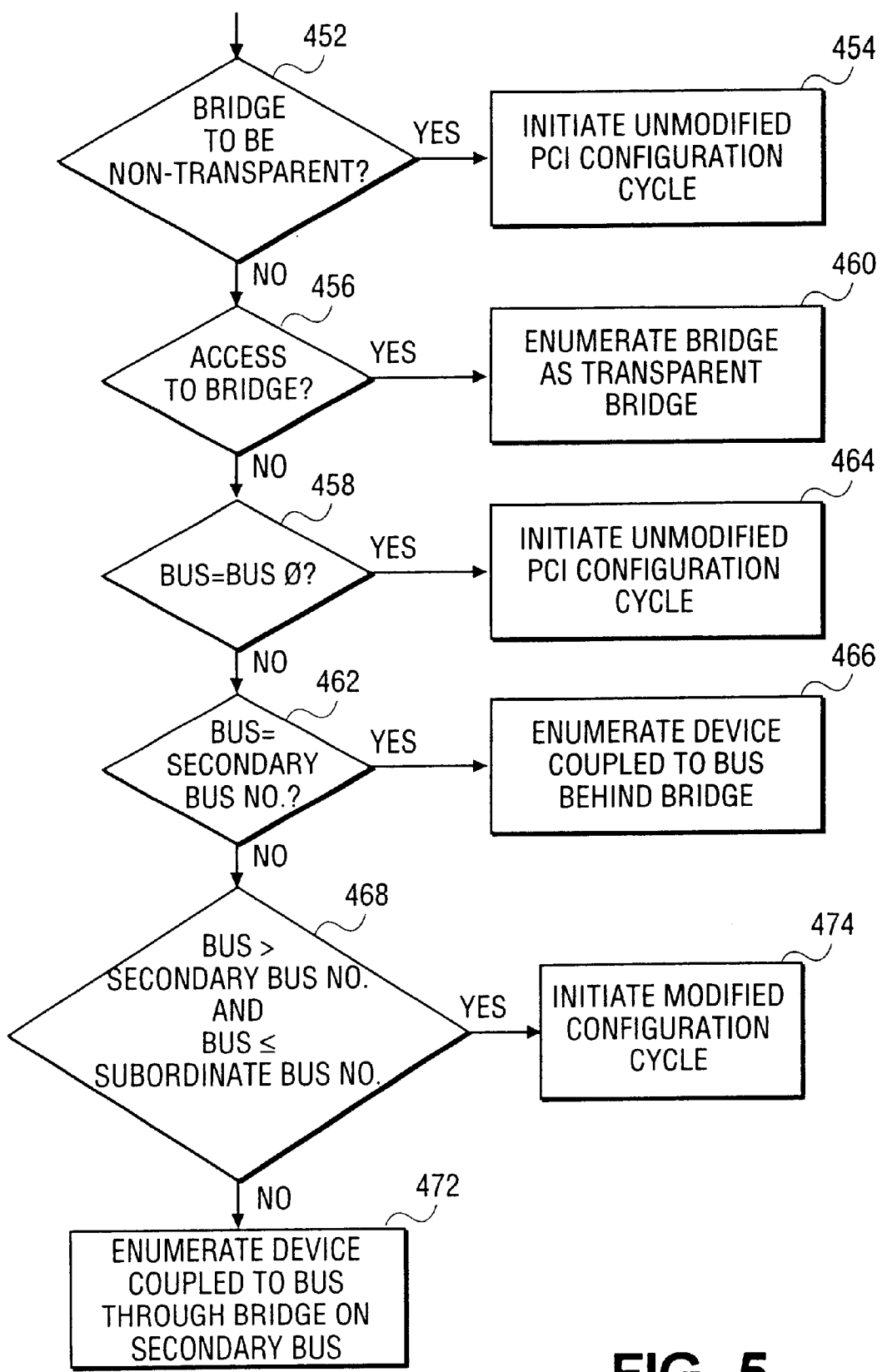
FIG. 5 is a flow diagram illustrating a procedure for enumerating devices in a bus configuration according to an embodiment of the present invention.

FIG. 5 shows a flow diagram illustrating a process 450 of identifying devices on a bus configuration and allocating resources to the identified devices. The process 450 may be executed in conjunction with the process 400 at block 410. However, embodiments of the present invention are not limited in this respect and the process 450 may be executed independently of any particular process of enumerating devices on a bus configuration.

In the embodiment illustrated with reference to FIG. 5, "bus 0" may comprise a bus segment formed at a secondary interface of a host bridge. However, embodiments of the present invention are not limited in this respect. In the illustrated embodiment, a second bridge is coupled to bus 0, and between bus 0 and a bus 1 (formed on an interface of the second bridge which is opposite bus 0). However, embodiments of the present invention are not limited in this respect and such a second bridge may reside at a different location in a bus configuration. Such a second bridge may behave as a non-transparent bridge in a native state such as the 21555 bridge sold by Intel Corporation. Again, this is merely an example of a commercially available device which may be used in implementing the second bridge and embodiments of the present invention are not limited in this respect.

In one embodiment, the process 450 may be integrated as part of a PCI configuration enumeration procedure which generates access requests to initiate type 0 and type 1 configuration transactions. However, embodiments of the present invention are not limited in this respect.

The process 450 may identify and allocate resources to device on a bus configuration using type 0 and type 1 configuration transactions. The process 450 may initiate type 0 configuration transactions on a bus to allocate resources to devices coupled to the bus and initiate type 1 configuration transactions on the bus to allocate resources to devices coupled to busses behind a transparent bridge coupled to the bus. However, as indicated by the conditions of diamonds 452, 456, 458, 462 and 468, the process 450 may apply additional logic in determining any action to be taken with respect to a device during an enumeration procedure. Again, embodiments of the present invention are not limited in this respect.

Diamond 452 determines whether the single bridge on bus 0 is to behave as a transparent or non-transparent bridge. For example, if the bridge is part of a system board performing a central function in a processing platform such as the bridge 110 in the processing board 100 of the embodiment of FIG. 3, the bridge may be adapted to behave as a transparent bridge. Similarly, if the bridge is part of an add-in card performing a peripheral function in a processing platform such as the bridge 110 in the processing board 100 of the embodiment of FIG. 2, for example, the bridge may be adapted to behave as a non-transparent bridge. According to an embodiment, diamond 452 may determine whether the bridge is to behave as a transparent or non-transparent bridge based upon a system function signal. In an embodiment in which the processing board 100 is formed according to the CompactPCI Specification, for example, the diamond 452 may determine whether the single bridge on bus 0 is to behave as a transparent or non-transparent bridge based upon a system function signal derived from the SYSEN data. However, embodiments of the present invention are not limited in this respect and such a system function signal may be derived using other techniques.

If diamond 452 determines that the bridge coupled to bus 0 is to behave as a transparent bridge, diamond 456 may determine whether the access request is being made to the bridge at its predetermined location on bus 0 so that the bridge may be enumerated as a transparent bridge at block 460. According to an embodiment, block 460 may access information characterizing the bridge as a transparent bridge and write this information in a data structure identifying the bridge as a transparent bridge at the predetermined location on bus 0.

In one embodiment, block 460 may emulate receipt of a configuration header from a transparent bridge indicating a transparent bridge. This may be indicated by, for example, a type register in the configuration header. Block 460 may also write other information in an emulated configuration header to enumerate the bridge as a transparent bridge. An existing procedure adapted for processing configuration headers as part of an enumeration process may then process the emulated configuration header to enumerate the bridge, and initiate subsequent requests for type 1 configuration transactions for enumerating devices coupled to the bridge through a secondary bus. However, embodiments of the present invention are not limited in this respect and block 460 may employ techniques for indicating the presence of a transparent or non-transparent bridge other than emulating a configuration header from a transparent bridge.

According to an embodiment, the bridge at the predetermined location on bus 0 is capable of supporting indirect configuration transactions on a primary interface with bus 0. Such a bridge may be a 21555 bridge sold by Intel Corporation including indirect configuration address and data registers which are accessible by a bus coupled to the secondary ("logical" primary) interface of the bridge. However, embodiments of the present invention are not limited in this respect and other bridge products with indirect addressing capability may be used.

Enumeration software may write to a first indirect address register an address corresponding to a target device located behind the bridge. The enumeration software may then write to/read from a second indirect data register. The data retrieved from the second indirect data register may then be used to emulate the receipt of configuration header data from the targeted device in the course of a procedure for processing the configuration header data, and allocating resources to the target device. In an embodiment in which the bridge is a 21555 bridge in a native non-transparent state defining a secondary bus as being the closest bus to a local processing system and a primary bus being the farthest from the local processing system, indirect addressing may be performed on the secondary bus (acting as a "logical" primary bus in the transparent state) using an upstream indirect configuration address register (acting as the first indirect addressing register to receive a bus address corresponding to a target device) and an upstream configuration data register (acting as the second indirect addressing register to write/read information to/from the logical secondary interface). However, embodiments of the present invention are not limited in this respect and other techniques may be used for identifying devices coupled behind a bridge which natively operates non-transparent state.

If an access request is directed to a device on the logical secondary bus of the bridge coupled to bus 0 as indicated by diamond 462, block 466 may enumerate initiating bus commands to bus 0 write to and read from indirect addressing registers on the primary interface of the bridge. In one embodiment, block 466 may emulate a type 0 configuration transaction with the targeted device on the secondary bus. However, embodiments of the present invention are not limited in this respect. If the access request is directed to a targeted device on a bus coupled to the secondary bus by another bridge as detected at diamond 468, block 472 may emulate a type 1 configuration transaction on the secondary bus to enumerate the targeted device. Again, embodiments of the present invention are not limited in this respect.

In the illustrated embodiment, if any of the conditions of diamonds 452, 458, or 468 are met, the process 450 is to allow the enumeration process to proceed independently of whether the bridge at the predetermined location on bus 0 is to appear as a transparent bridge or non-transparent bridge at blocks 454, 464 and 474. That is, the process 450 may initiate type 0 configuration transactions on a bus 0 to allocate resources to devices coupled to bus 0, and may initiate type 1 configuration transactions to allocate resources to devices on a bus coupled to bus 0 through a bridge. However, embodiments of the present invention are not limited in this respect and blocks 454, 464 and 474 may enumerate these devices using other techniques.

In the illustrated embodiment, the process 450 may initiate a bus command on bus 0 to write to a first indirect configuration address register an address corresponding to a target device located behind the bridge. Process 450 may then initiate a subsequent bus command to write/read the contents to/from the second indirect configuration register. In this manner, the process 450 may extract information to emulate access requests for a type 1 configuration transaction with devices located behind the bridge (e.g., emulating type 1 configuration transactions at block 466 or 472 of FIG. 5). Here, to emulate such a type 1 configuration transaction directed to a target device, the process 450 may write an address of the target device to the first indirect configuration address register and write/read information to/from the target device through the second indirect addressing register. The process 450 may then allocate resources to the target device. It should be understood, however, that embodiments of the present invention are not limited in this respect and other techniques may be used for processing information received from indirect addressing registers for enumerating devices behind a bridge.

In an embodiment discussed above, the process 450 may emulate type 0 configuration transactions at block 460 and type 1 configuration transactions at blocks 466 and 472 execute in conjunction with an existing enumeration procedure adapted for processing configuration headers responding to type 0 and type 1 requests. In an alternative embodiment, for example, block 460 may process a configuration header returned by the bridge including a register with descriptive information identifying the bridge such as "Device ID" or "Class Code" registers of a PCI configuration header as outlined section of 3.2 of the PCI Bridge Specification. However, it should be understood that embodiments of the present invention are not limited in this respect an other techniques may be use to provide block 460 with descriptive information. Based upon the descriptive information, the process 450 at blocks 466 and 472 may interrogate indirect configuration registers of the bridge to enumerate devices coupled behind the bridge independently of any emulated requests for type 0 or type 1 configuration transactions.

Figure 6:
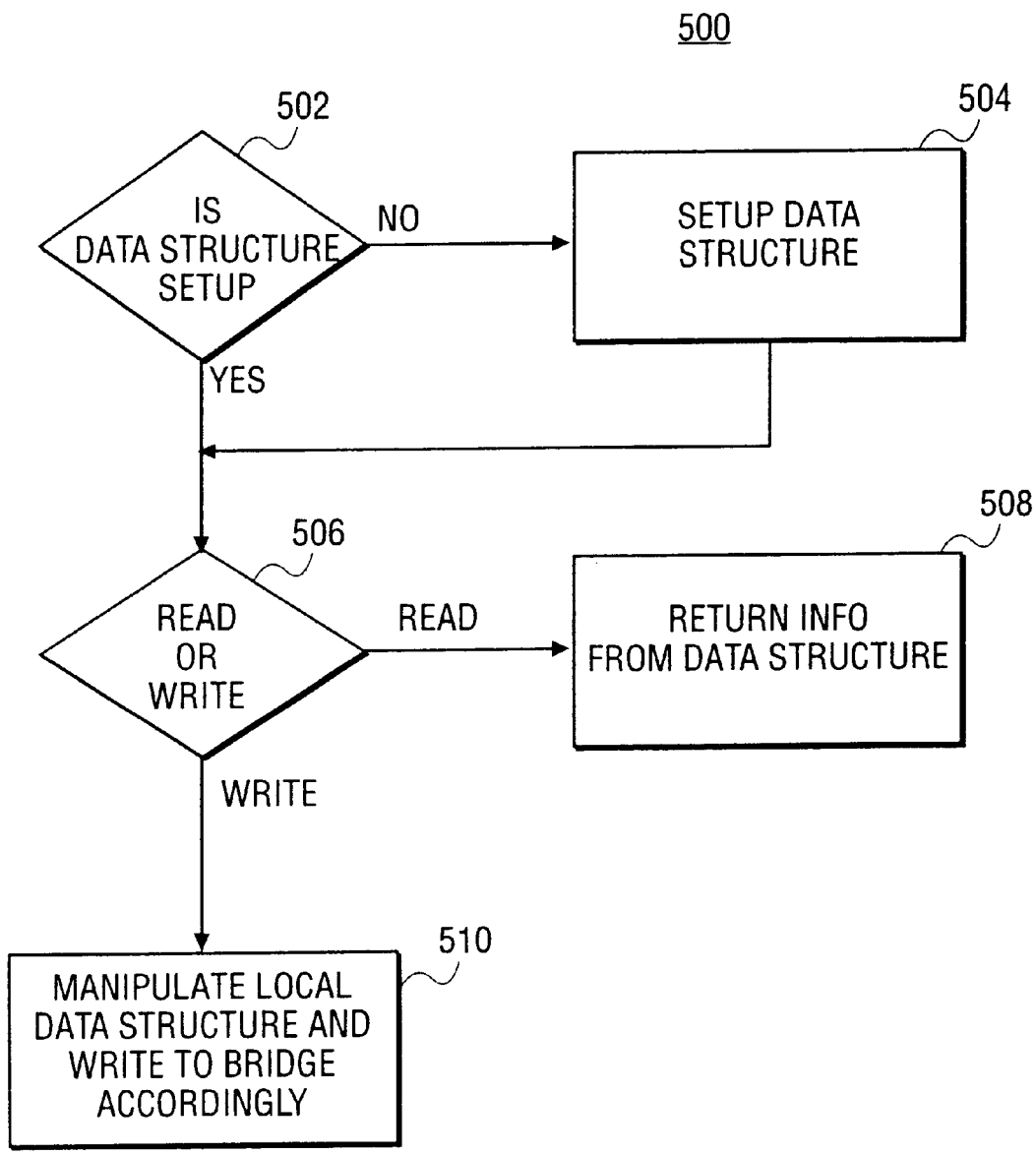
FIG. 6 shows a flow diagram illustrating a process executed for enumerating a bridge as a transparent bridge according to an embodiment of the present invention.

FIG. 6 shows a flow diagram illustrating an embodiment of a process executed at block 460 for enumerating a bridge as a transparent bridge. Here, enumeration software may access the bridge registers to obtain information to be provided in a local data structure and access the bridge registers to establish an input/output window with the bridge. Diamond 502 and block 504 may ensure that a local data structure for communicating with the bridge is provided. The enumeration software may initiate a transaction with the bridge to read data from registers at the bridge which is to be incorporated into the local data structure. The enumeration software may initiate another transaction with the bridge to write to a base address register (BAR) on the bridge to set up a minimum input/output window through the bridge at block 510. However, this is merely an example of a process for enumerating a bridge as a transparent bridge and embodiments of the present invention are not limited in this respect.

Figure 7:
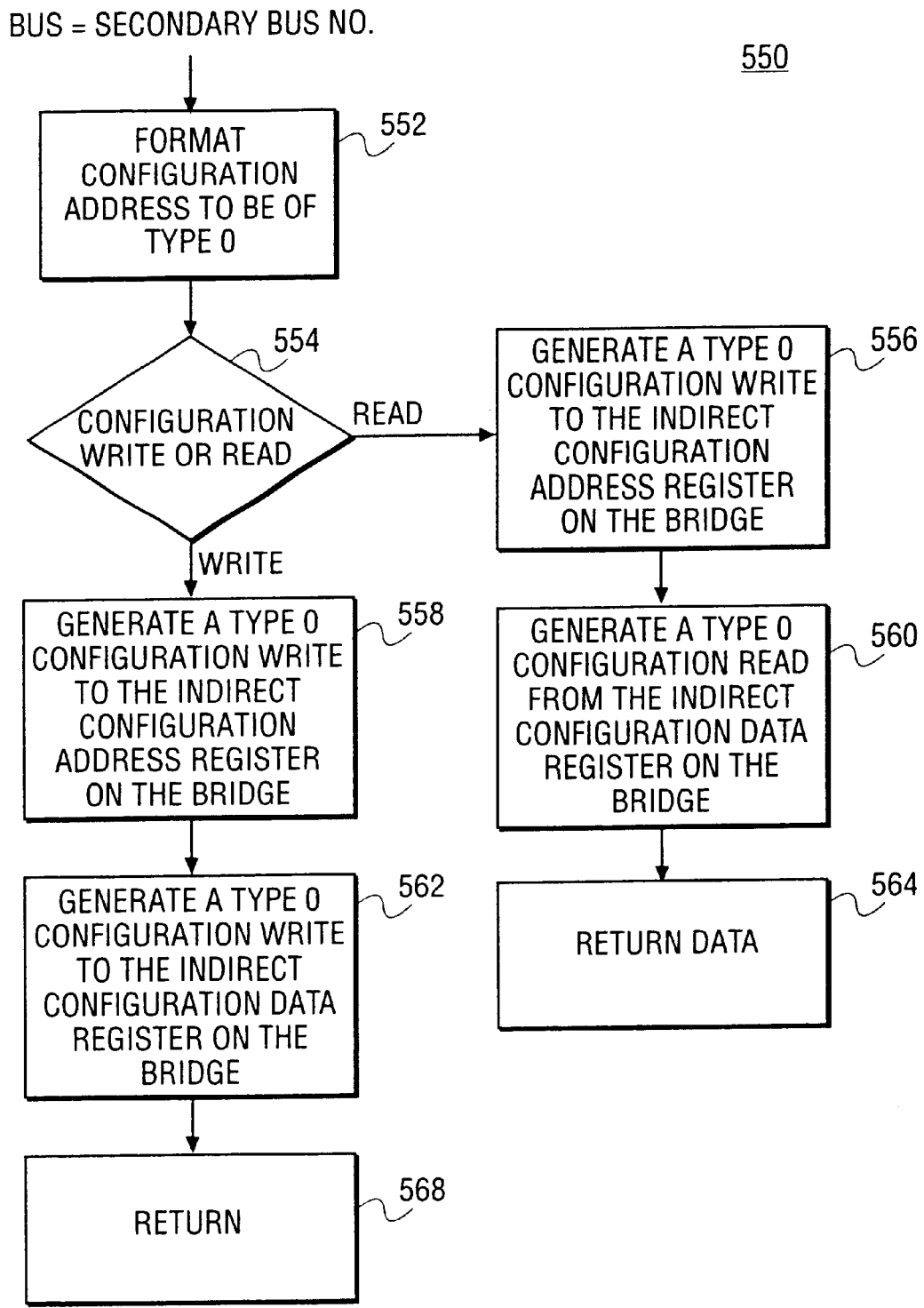
FIG. 7 shows a flow diagram illustrating a process for enumerating a device coupled to a bus behind a bridge configured as a transparent bridge according to an embodiment of the present invention.

FIG. 7 shows a flow diagram illustrating an embodiment of a process executed at block 466 for enumerating a device coupled to a bus behind a bridge configured as a transparent bridge. The enumeration software may initially format a configuration address for the device as a type 0 configuration transaction at block 552. The enumeration software may initiate one or more transactions with the bridge to read configuration data for the device from the bridge at blocks 556 and 560 by writing to an indirect configuration address register and reading from an indirect configuration data register. The enumeration software may then incorporate the returned data into the local data structure. The enumeration software may also initiate one or more transactions with the bridge to establish communication with the device at blocks 558 and 562 by writing to the indirect configuration data and address registers of the bridge to set up a minimum input/output window. However, this is merely an example of a process for enumerating a device coupled to a bus behind a bridge configured as a transparent bridge, and embodiments of the present invention are not limited in this respect.

Figure 8:
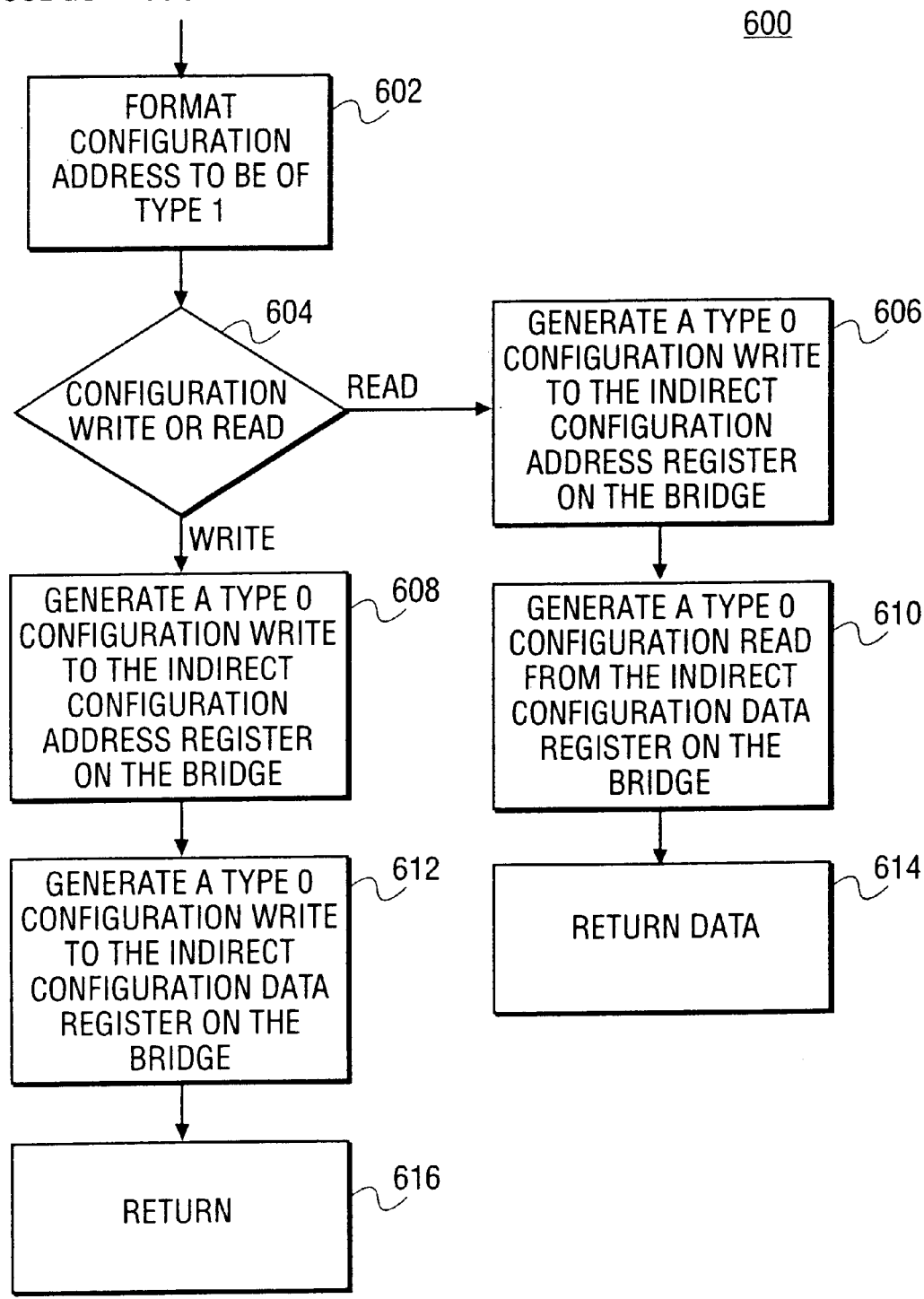
FIG. 8 shows a flow diagram illustrating a process for enumerating a device coupled to a bus through a second bridge coupled behind the bridge configured as a transparent bridge according to an embodiment of the present invention.

FIG. 8 shows a flow diagram illustrating an embodiment of a process executed at block 472 for enumerating a device coupled to a bus through a second bridge coupled behind the bridge configured as a transparent bridge. The enumeration software may initially format a configuration address of the device to be of a type 1 configuration address at block 602. The enumeration software may initiate one or more transactions with the bridge to read configuration data for the device from the bridge at blocks 606 and 610 by writing to an indirect configuration address register and reading from an indirect configuration data register. The enumeration software may then incorporate the returned data into the local data structure. The enumeration software may also initiate one or more transactions with the bridge to establish communication with the device at blocks 601 and 612 by writing to the indirect configuration data and address registers of the bridge to set up a minimum input/output window. However, this is merely an example of a process for enumerating a device coupled to a bus through a second bridge coupled behind a bridge configured as a transparent bridge, and embodiments of the present invention are not limited in this respect.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

receiving a system function signal at a circuit coupled to a processing system, the processing system being coupled to a bus configuration at a bridge, the system function signal indicating a function of the processing system from among a plurality of functions including a platform central function; and selectively configuring resources at the processing system to communicate with the bridge as one of a transparent bridge and a non-transparent bridge based upon the system function signal.

2. The method of claim 1, the method further comprising selectively emulating a presence of a transparent bridge based upon the system function signal.

3. The method of claim 2, the method further comprising:

emulating a receipt of configuration header data at the processing system from a transparent bridge; and initiating one or more polling signals to the bridge through devices in response to the configuration header data.

4. The method of claim 1, wherein the processing system is coupled to the bridge through the first bus and wherein the method further comprises:

loading address data to a first register of the bridge from the first bus, the address data being representative of an address of a device coupled to the second bus;

retrieving device descriptor data on the first bus from a second register of the bridge, the descriptor data being descriptive of the device; and configuring resources at the processing system to communicate with the device based upon the device descriptor data.

5. The method of claim 1, wherein the bus configuration comprises a PCI bus configuration and the bridge is coupled to the processing system through the first bus, and wherein the method further comprises:

initiating bus commands addressed to devices coupled to the first bus to request type 0 configuration transactions; and in response to detection of a transparent bridge, initiating bus commands to request type 1 configuration transactions with devices coupled to the processing system through the transparent bridge.

6. The method of claim 1, wherein the processing system and bridge are integrated with a system board and the method further comprises:

detecting a signal at the system board indicative of a function of the system board in a processing platform; and generating the system function signal in response to the detected signal.

7. The method of claim 6, the method further comprising detecting the signal indicative of the function of the system board at an interface between the system board and a bus in the processing platform.

8. An article comprising:

a storage medium comprising machine-readable instructions stored thereon for:

receiving a system function signal at a circuit coupled to a processing system, the processing system being coupled to a bus configuration at a bridge, the system function signal indicating a function of the processing system from among a plurality of functions including a platform central function; and selectively configuring resources at the processing system to communicate with the bridge as one of a transparent bridge and a non-transparent bridge based upon the system function signal.

9. The article of claim 8, wherein the storage medium further comprises machine-readable instructions stored thereon for selectively emulating a presence of a transparent bridge based upon the system function signal.

10. The article of claim 9, wherein the storage medium further comprises machine-readable instructions stored thereon for:

emulating a receipt of configuration header data at the processing system from a transparent bridge; and initiating one or more polling signals to the bridge to devices in response to the configuration header data.

11. The article of claim 8, wherein the processing system is coupled to the bridge through the first bus and wherein the storage medium further comprises machine-readable instructions stored thereon for:

loading address data to a first register of the bridge from the first bus, the address data being representative of an address of a device coupled to the second bus;

retrieving device descriptor data on the first bus from a second register of the bridge, the descriptor data being descriptive of the device; and configuring resources at the processing system to communicate with the device based upon the device descriptor data.

12. The article of claim 8, wherein the bus configuration comprises a PCI bus configuration and the bridge is coupled to the processing system through the first bus, and wherein the storage medium further comprises machine-readable instructions stored thereon for:

initiating bus commands addressed to devices coupled to the first bus to request type 0 configuration transactions; and in response to detection of a transparent bridge, initiating bus commands to request type 1 configuration transactions with devices coupled to the processing system through the transparent bridge.

13. The article of claim 8, wherein the processing system and bridge are integrated with a system board, and wherein the storage medium further comprises machine-readable instructions stored thereon for generating the system function signal in response to a detection of a signal at the system board indicative of a function of the system board in a processing platform.

14. A system comprising:

a bus configuration, the bus configuration comprising a first bus, a second bus and a bridge coupled between the first and second busses; and a processing system coupled to the bus configuration, the processing system comprising:

logic to receive a system function signal at a circuit coupled to the processing system, the system function signal indicating a function of the processing system from among a plurality of functions including a platform central function; and logic to selectively configure resources at the processing system to communicate with the bridge as one of a transparent bridge or a non-transparent bridge based upon a system function signal.

15. The system of claim 14, wherein the processing system further comprises logic to selectively emulate a presence of a transparent bridge based upon the system function signal.

16. The system of claim 15, wherein the processing system further comprises:

logic to emulate a receipt of configuration header data at the processing system from a transparent bridge; and logic to initiate one or more polling signals to the bridge to devices in response to the configuration header data.

17. The system of claim 14, wherein the processing system is coupled to the bridge through the first bus and wherein the processing system further comprises:

logic to initiate a bus command on the first bus to load address data to a first register of the bridge from the first bus, the address data being representative of an address of a device coupled to the second bus;

logic to retrieve device descriptor data provided on the first bus from a second register of the bridge, the descriptor data being descriptive of the device; and logic to configure resources at the processing system to communicate with the device based upon the device descriptor data.

18. The system of claim 14, wherein the bus configuration comprises a PCI bus configuration and the bridge is coupled to the processing system through the first bus, and wherein the processing system further comprises:

logic to initiate bus commands addressed to devices coupled to the first bus to request type 0 configuration transactions; and logic to initiate bus commands to request type 1 configuration transactions with devices coupled to the processing system through the transparent bridge in response to detection of a transparent bridge.

19. The system of claim 14, wherein the processing system and bridge are integrated with a system board, and wherein the processing system further comprises logic to generate the system function signal in based upon a detection of a signal at the system board indicative of a function of the system board in a processing platform.

20. The system of claim 19, wherein the signal indicative of the function of the system board is detected at an interface between the system board and a bus in the processing platform.

21. A system board comprising:

a processing system;

an interface adapted for coupling to a bus in a processing platform; and a bridge coupled between the processing system and the interface, wherein the processing system further comprises logic to selectively configure resources at the processing system to communicate with the bridge as one of a transparent bridge and a non-transparent bridge based upon a system function signal, the system function signal indicating a function of the processing system from among a plurality of functions including a platform central function.

22. The system board of claim 21, the system board further comprising logic to selectively emulate a presence of a transparent bridge based upon the system function signal.

23. The system board of claim 22, the system board further comprising:
logic to emulate a receipt of configuration header data at the processing system from a transparent bridge; and
logic to initiate one or more polling signals to the bridge to devices in response to the configuration header data.

24. The system board of claim 21, the system further comprising:
logic to load address data to a first register of the bridge from a bus coupling the bridge to the processing system, the address data being representative of an address of a device coupled to the bus through the bridge;
logic to retrieve device descriptor data on the bus from a second register of the bridge, the descriptor data being descriptive of the device; and
logic to configure resources at the processing system to communicate with the device based upon the device descriptor data.

25. The system board of claim 21, wherein the system board further comprises:
a PCI bus coupled between the bridge and the processing system;
logic to initiate bus commands addressed to devices coupled to the PCI bus to request type 0 configuration transactions; and
logic to initiate bus commands to request type 1 configuration transactions with devices coupled to the processing system through a transparent bridge in response to detection of the transparent bridge.

26. The system board of claim 21, wherein the processing system and bridge are integrated with a system board and the method further comprises:
logic to detect a signal at the system board indicative of a function of the system board in a processing platform; and
logic to generate the system function signal in response to the detected signal.

27. The system board of claim 26, the system board further comprising logic to detect the signal indicative of the function of the system board at an interface between the system board and the bus in the processing platform.

28. An apparatus comprising:
means for receiving a system function signal at a circuit coupled to a processing system, the processing system being coupled to a bus configuration at a bridge, the system function signal indicating a function of the processing system from among a plurality of functions including a platform central function; and
means for selectively configuring resources at the processing system to communicate with the bridge as one of a transparent bridge and a non-transparent bridge based upon the system function signal.

29. The apparatus of claim 28, wherein the apparatus further comprises means for selectively emulating a presence of a transparent bridge based upon the system function signal.

30. The apparatus of claim 29, the method further comprising:
means for emulating a receipt of configuration header data at the processing system from a transparent bridge; and
means for initiating one or more polling signals to the bridge through devices in response to the configuration header data.

31. The method of claim 1, the method further comprising configuring resources at the processing system to communicate with the bridge as a transparent bridge in response to an indication from the system function signal that the processing system is to perform a platform central function.

32. The method of claim 31, wherein the plurality of functions further includes a peripheral function, and wherein the method further comprises configuring resources at the processing system to communicate with the bridge as a non-transparent bridge in response to an indication from the system function signal that the processing system is to perform a peripheral function.

33. The article of claim 8, wherein the storage medium further comprises machine-readable instructions stored thereon to configure resources at the processing system to communicate with the bridge as a transparent bridge in response to an indication from the system function signal that the processing system is to perform a platform central function.

34. The article of claim 33, wherein the plurality of functions further includes a peripheral function, and wherein the storage medium further comprises machine-readable instructions stored thereon to configure resources at the processing system to communicate with the bridge as a non-transparent bridge in response to an indication from the system function signal that the processing system is to perform a peripheral function.

35. The system of claim 14, wherein the logic to selectively configure resources at the processing system comprises logic to configure resources at the processing system to communicate with the bridge as a transparent bridge in response to an indication from the system function signal that the processing system is to perform a platform central function.

36. The system method of claim 35, wherein the plurality of functions further includes a peripheral function, and wherein the logic to selectively configure resources at the processing system further comprises logic to configure resources at the processing system to communicate with the bridge as a non-transparent bridge in response to an indication from the system function signal that the processing system is to perform a peripheral function.

37. The apparatus of claim 28, the apparatus further comprising means for configuring resources at the processing system to communicate with the bridge as a transparent bridge in response to an indication from the system function signal that the processing system is to perform a platform central function.

38. The apparatus of claim 37, wherein the plurality of functions further includes a peripheral function, and wherein the apparatus further comprises means for configuring resources at the processing system to communicate with the bridge as a non-transparent bridge in response to an indication from the system function signal that the processing system is to perform a peripheral function.

* * * * *